United States Patent [19]

Polak

[11] 3,951,010

[45] Apr. 20, 1976

[54] EXTENDED RANGE FOUR SPEED TRANSMISSION

[75] Inventor: James C. Polak, Indianapolis, Ind.

[73] Assignee: General Motors Corporation, Detroit, Mich.

[22] Filed: Nov. 25, 1974

[21] Appl. No.: 526,593

[52] U.S. Cl. ................................................ 74/759
[51] Int. Cl.² ........................................ F16H 57/10
[58] Field of Search ............ 74/758, 759, 761, 763, 74/765, 767, 769

[56] References Cited
UNITED STATES PATENTS 3,545,304  12/1970  Schmidt et al. .................... 74/763 X
3,823,622  7/1974  Mori et al. ............................ 74/759

*Primary Examiner*—Samuel Scott
*Assistant Examiner*—Lance W. Chandler
*Attorney, Agent, or Firm*—Donald F. Scherer

[57]  ABSTRACT

A planetary transmission having three substantially equal size simple planetary gear sets, two selectively operable clutches and three selectively operable brakes for providing four forward and two reverse speed ranges. The forward and reverse low ranges provide high torque multiplication for high tractive effort while the other forward ranges permit close step ratios for traveling speed operation of the vehicle.

1 Claim, 1 Drawing Figure

U.S. Patent  April 20, 1976  3,951,010
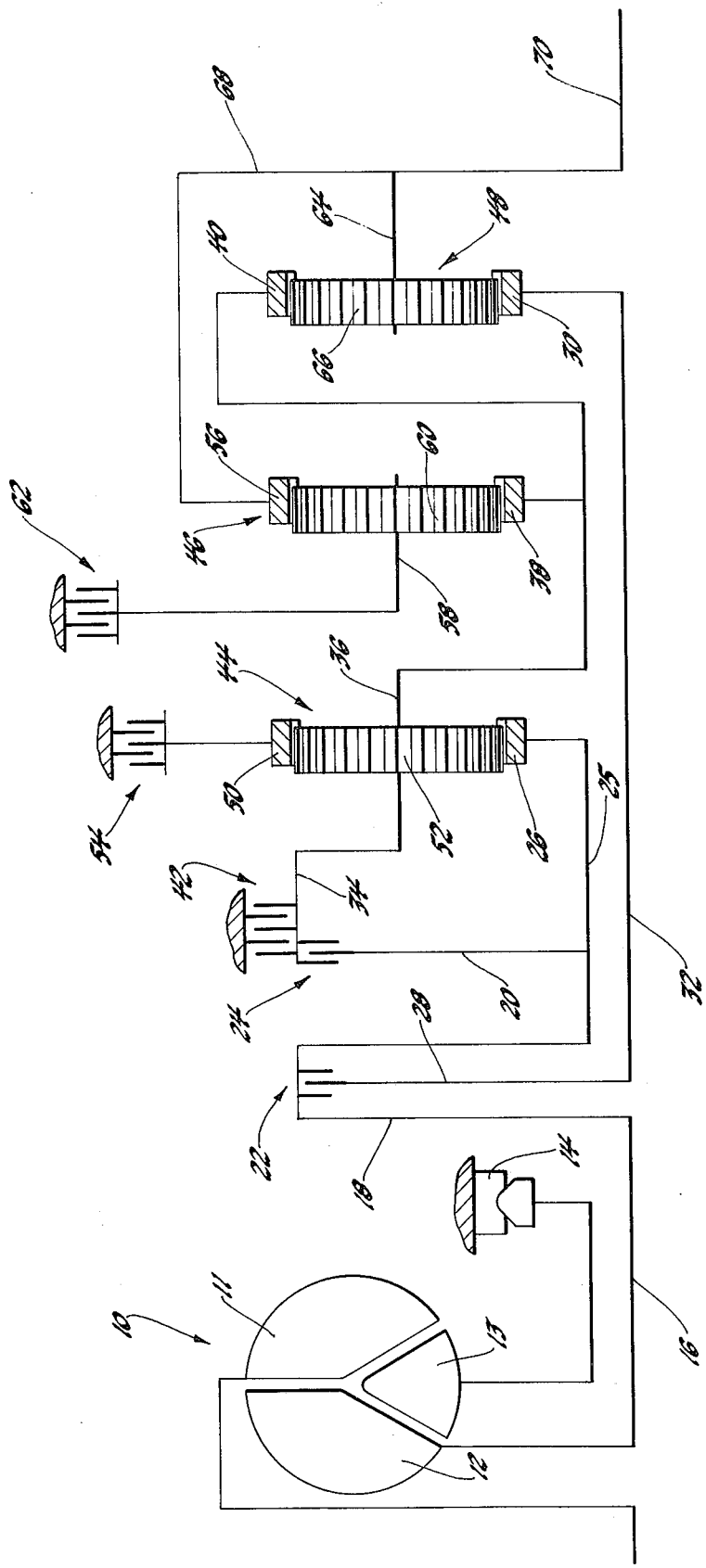

EXTENDED RANGE FOUR SPEED TRANSMISSION

This invention relates to planetary transmissions and more particularly to planetary transmissions having a high torque multiplication in low range.

The present invention provides four forward ratios and two reverse ratios. The forward ratios are separated in such a manner to provide wide ratio coverage through the use of three substantially equal sized planetary gear sets. The reverse ratios also provide wide ratio coverage through the utilization of two of the planetary gear sets. There are many prior art four speed transmissions such as those shown in U.S. Pat. Nos. 3,730,022, and 3,705,521 which utilize substantially equal sized planetary gear sets, however these devices provide much less ratio coverage than the present invention. In prior transmissions extended range coverage was accomplished by including additional gear sets in the transmission or by utilizing high reduction ratio planetary gear set to provide the low range drive.

The present invention can provide a seven to one forward ratio coverage in the four forward gears and a three to one step between the reverse ratio when the three planetary gear sets have a ring gear which has twice the number of teeth as the sun gear. Prior art transmissions utilizing planetary gear sets wherein the ring is twice the size as the sun provide substantially conventional ratio coverages.

It is an object of the present invention to provide an improved transmission having four forward drive ratios and two reverse drive ratios wherein the low forward and reverse ratios provide high torque multiplication.

It is another object of this invention to provide an improved transmission having four forward and two reverse drive ratios wherein three equal size planetary gear sets are comprised to provide the ratios and wherein the low, forward and reverse ratios having high torque multiplication and a 2.3 to 1 or greater ratio step is provided between the low and second ratios in both forward and reverse drives.

Another object of this invention is to provide an improved transmission having three equal sized planetary gear sets for providing a large ratio step between first and second ratios in both the forward and reverse drives and wide ratio coverage in the forward drive ratio.

These and other objects and advantages of the present invention will be more apparent from the following description and drawing which is a schematic representation of the transmission gearing.

The transmission includes a torque converter 10 having an impeller 11, adapted to be driven by an engine not shown, a turbine 12 and a stator 13 which is grounded through a conventional one way device 14. The torque converter 10 is a conventional fluid torque converter, the construction of which is well known in the art.

The turbine 12 is drivingly connected to a transmission input shaft 16 which is drivingly connected through hubs 18 and 20 and shaft 25 to a first clutch 22, a second clutch 24 and a sun gear 26 respectively. The clutch 22 has an output hub 28 which is drivingly connected to a sun gear 30 through an intermediate shaft 32. The clutch 24 has an output hub 34 which is drivingly connected to a carrier 36, a sun gear 38, and a ring gear 40. The output hub 34 is also drivingly connected to a selectively operable brake 42.

The sun gear 26 and carrier 36 are components of a first simple planetary gear set 44, the sun gear 38 is a component of a second simple planetary gear set 46, and the sun gear 30 and ring gear 40 are components of a third simple planetary gear set 48. The first planetary gear set 44 also includes the ring gear 50 and a plurality of pinions, such as 52, rotatably mounted on the carrier 36 in meshing engagement with the sun gear 26 and the ring gear 50. The ring gear 50 is operatively connected to a selectively engageable brake 54.

The second planetary gear set 46 includes a ring gear 56, a carrier member 58, and a plurality of planet pinions, such as 60, rotatably mounted on the carrier 58 in meshing engagement with the sun gear 38 and the ring gear 56. The carrier 58 is operatively connected to a selectively engageable brake 62.

The planetary gear set 48 includes a carrier 64 and a plurality of pinions, such as 66, which are rotatably mounted on the carrier 64 in meshing engagement with the sun gear 30 and ring gear 40. The carrier 64 is drivingly connected with a hub 68 which hub 68 is also drivingly connected to the ring gear 56 and a transmission output shaft 70.

The clutches 22 and 24 and the brakes 42, 54 and 62 are preferably disc type fluid operated devices the construction of which is well known. These devices may be controlled electrically, mechanically, pneumatically, or hydraulically with many of the well known control systems which is currently available.

For the following description of operation the planetary gear sets 44, 46, and 48 are each considered to have 30 teeth on their respective sun gear and 60 teeth on their respective ring gear thus making them three to one planetary gear sets.

It is well known that in a three to one planetary gear set the carrier torque is three times the sun gear torque and the ring gear torque is twice the sun gear torque such that the sum of the sun and ring gear torques equal the carrier torque. Thus if the ring gear is held stationary and one unit of torque is applied to the sun gear, the carrier will deliver three units of torque. If the carrier is held stationary and one unit of torque is delivered to the sun gear the ring gear will deliver two units of toruqe in a direction opposite to the torque applied to the sun gear.

Clutch 22 is applied in all forward drive ratios. Brake 62 is applied for the forward low or first drive ratio, brake 42 is applied for the second forward ratio, brake 54 is applied for the third forward drive ratio, and clutch 24 is applied for the fourth forward drive ratio. For the low reverse drive ratio brakes 54 and 62 are applied, and during the high reverse drive ratio clutch 24 and brake 62 are applied. It should be understood that in the drive ratios otherwise than designated above the clutches and brakes are released. It will also be noted from the above that there are no double transition shifts between single steps in either the forward or reverse drive ratios, that is a ratio change from one drive ratio to another, either up or down, is accomplished by an interchange of only one friction device for another.

When the transmission is conditioned for the first forward drive ratio, input torque on shaft 16 is delivered to the sun gear 30 through clutch 22. The carrier 64 has imposed therein a torque equal to three times input while the ring gear 40 has imposed thereon a torque equal to two times input. The torque on the ring gear 40 is also imposed on the sun gear 38. Since the carrier 58 is held stationary by the brake 62, the ring gear 56 has imposed thereon a torque equal to two times the torque on sun gear 38, thus the torque on ring gear 56 is equal to four times input torque. Since the ring gear 56 in carrier 64 are both connected to the output shaft 70 and driven in the same direction, the output shaft 70 has imposed thereon a value equal to seven times input torque. If the torque converter 10 is operating in a one to one torque ratio, the output torque is equal to seven times engine torque. If the torque converter 10 is in the torque conversion phase of operation, the output torque on shaft 70 would be increased relative to engine torque by the torque multiplication factor of the torque converter 10.

In second gear operation, sun gear 30 has imposed thereon a torque value equal to input torque. The ring gear 40 is held stationary by brake 42, therefore the torque on carrier 64 and output shaft 70 is equal to three times the input torque. Thus the ratio step between the first and second ratios is substantially 2.33.

In third gear the brake 54 is engaged such that the input torque on shaft 16 is split between the sun gears 26 and 30. The sun gear 30 has imposed thereon a 0.6 units of input torque and the sun gear 26 has imposed thereon 0.4 units of input torque. Since the ring gear 50 is held stationary, the carrier 36 has imposed thereon 1.2 units of input torque. This torque is also imposed on the ring gear 40. The sum of the torques on ring gear 40 and sun gear 30 is imposed on the carrier 64 such that a torque value equal to 1.8 times input torque is imposed on the output shaft 70. It is readily seen that the ratio step between second and third ratios is 1.66.

In the fourth forward speed the planetary gear sets are driven in a locked up condition by clutches 22 and 24 such that a one to one drive from input to output is provided. Therefore it is seen that the ratio step between third and fourth ratios is 1.8.

In the low reverse drive ratio input torque is imposed on sun gear 26. Since the ring gear 50 is held stationary the carrier 36 has imposed thereon a torque equal to three times input torque in the same or forward direction. The torque on carrier 36 is also imposed on sun gear 38. Since the carrier 58 is stationary, the ring gear 56 and therefore output shaft 70 has a torque imposed thereon equal to two times the torque of sun gear 38 in the reverse direction. Thus the output torque is six times input torque in the reverse direction.

In the high reverse ratio, the planetary set 44 is locked up by clutch 24 such that input torque is imposed on sun gear 38. Since the carrier 38 is held stationary, the ring gear 56 has imposed thereon a torque equal to two times input torque in a reverse direction. Thus, the output torque in a high reverse ratio is equal to two times the input torque. From the above it can be seen that a ratio step of 3.0 is provided between the low and high reverse ratios.

The drive ratios discussed above can of course be varied by varying the number of teeth on the sun and ring gears of the planetary gear sets while maintaining conventional planetary gear design practices. It is preferable to have all of the sun gears of equal size and all of the ring gears of equal size to reduce manufacturing costs and to make full utilization of the gear cutting machinery on which the gears are manufactured.

Obviously, many modifications and variations of the present invention are possible in light of the above teachings. It is, therefore, to be understood that within the scope of the appended claims the invention may be practiced otherwise than as specifically described.

What is claimed is:

1. A planetary transmission having four forward drive ranges and two reverse drive ranges comprising; an input shaft; an output shaft; a first simple planetary gear set having a sun gear member continuously drivingly connected to said input shaft, a carrier member, and a ring gear member; a second simple planetary gear set having a ring gear member continuously drivingly connected to said output shaft, a sun gear member, and a carrier member; a third simple planetary gear set having a carrier member continuously drivingly connected to said output shaft, a ring gear member, and a sun gear member; drive transmitting means continuously drive connecting said carrier; sun gear, ring gear members of said first, second and third planetary gear sets respectively; an intermediate shaft drivingly connected to said sun gear member of said third planetary gear set; first selectively operable brake means for selectively preventing rotation of said carrier member of said second planetary gear set; second selectively operable brake means for selectively preventing rotation of said ring gear member of said first planetary gear set; third selectively operable brake means for selectively preventing rotation of said drive transmitting means; first selectively operable clutch means for selectively providing a drive connection between said input shaft and said intermediate shaft; and second selectively operable clutch means for selectively providing a drive connection between said input shaft and said drive transmitting means; said first clutch means and said first brake means being engaged to establish a first forward high torque-low speed ratio through the action of said second and third planetary gear sets; said first clutch means and said third brake means being engaged to establish a second forward speed ratio through the action of said third planetary gear set, said first clutch means and said second brake means being engaged to establish a third forward speed ratio through the action of said first and third planetary gear sets; said first brake means and said second brake means being engaged to establish a first reverse high torque-low speed ratio through the action of said first and second planetary gear sets; said second clutch means and said first brake means being engaged to establish a second reverse speed ratio through the action of said second planetary gear set.

* * * * *